US007644218B2

(12) United States Patent
Deng et al.

(10) Patent No.: US 7,644,218 B2
(45) Date of Patent: Jan. 5, 2010

(54) MULTIFUNCTION SEMICONDUCTOR STORAGE DEVICE AND A METHOD FOR BOOTING-UP COMPUTER HOST

(75) Inventors: Guoshun Deng, Shenzhen (CN); Xiaohua Cheng, Shenzhen (CN); Feng Xiang, Shenzhen (CN)

(73) Assignee: Netac Technology Co., Ltd (CN)

( * ) Notice: Subject to any disclaimer, the term of this patent is extended or adjusted under 35 U.S.C. 154(b) by 0 days.

(21) Appl. No.: 11/923,034

(22) Filed: Oct. 24, 2007

(65) Prior Publication Data

US 2008/0109567 A1 May 8, 2008

Related U.S. Application Data

(62) Division of application No. 11/520,387, filed on Sep. 13, 2006, now abandoned, which is a division of application No. 10/075,492, filed on Feb. 12, 2002, now Pat. No. 7,136,951.

(30) Foreign Application Priority Data

Jun. 30, 2001 (CN) ................................ 01 1 14883

(51) Int. Cl.
*H05K 7/10* (2006.01)
(52) U.S. Cl. ........................................ 710/302; 710/10
(58) Field of Classification Search ................ 710/302, 710/301, 8, 10
See application file for complete search history.

(56) References Cited

U.S. PATENT DOCUMENTS

| 4,541,019 | A | | 9/1985 | Precourt |
| 5,018,095 | A | * | 5/1991 | Nissimov ........................ 711/4 |
| 5,070,474 | A | | 12/1991 | Tuma et al. |
| 5,226,168 | A | * | 7/1993 | Kobayashi et al. ............. 703/25 |
| 5,261,104 | A | | 11/1993 | Bertram et al. |
| 5,319,751 | A | | 6/1994 | Garney |
| 5,404,527 | A | | 4/1995 | Irwin et al. |
| 5,459,850 | A | | 10/1995 | Clay et al. |
| 5,471,674 | A | | 11/1995 | Stewart et al. |
| 5,555,416 | A | | 9/1996 | Owens et al. |
| 5,590,306 | A | * | 12/1996 | Watanabe et al. ............ 711/115 |
| 5,590,311 | A | * | 12/1996 | Matsushima .................. 703/27 |
| 5,692,190 | A | * | 11/1997 | Williams ........................ 713/2 |
| 5,708,799 | A | * | 1/1998 | Gafken et al. ............... 710/301 |

(Continued)

FOREIGN PATENT DOCUMENTS

CN 1299096 6/2001

(Continued)

*Primary Examiner*—Paul R Myers
(74) *Attorney, Agent, or Firm*—Squire, Sanders & Dempsey L.L.P.

(57) ABSTRACT

A semiconductor storage device connected to the host system through the general purpose interface, including a semiconductor storage media module (1) and a controller module (2), in which the controller module (2) consists of a general purpose interface control module (21), a microprocessor and control module (22). Various device class protocols can be realized at the interface application level of the semiconductor storage device, which makes it possible to simulate and realize the storage functions of various storage disks. One or a plurality of storage spaces are opened up in the semiconductor storage media and one or a plurality of storage disks are supported by the same device; furthermore, the device supports hot plug and play and it is removable.

21 Claims, 9 Drawing Sheets

U.S. PATENT DOCUMENTS

| | | | |
|---|---|---|---|
| 5,717,886 A | 2/1998 | Miyauchi | |
| 5,822,184 A | 10/1998 | Rabinovitz et al. | |
| 5,860,135 A | 1/1999 | Sugita | |
| 5,887,164 A | 3/1999 | Gupta et al. | |
| 5,905,993 A * | 5/1999 | Shinohara | 711/103 |
| 5,920,733 A * | 7/1999 | Rao | 710/68 |
| 6,012,103 A | 1/2000 | Sartore et al. | |
| 6,055,631 A | 4/2000 | Chadha et al. | |
| 6,061,152 A * | 5/2000 | Nihei et al. | 358/448 |
| 6,148,354 A | 11/2000 | Ban et al. | |
| 6,252,791 B1 * | 6/2001 | Wallace et al. | 365/52 |
| 6,430,635 B1 | 8/2002 | Kwon et al. | |
| 6,438,638 B1 * | 8/2002 | Jones et al. | 710/301 |
| 6,453,414 B1 | 9/2002 | Ryu | |
| 6,646,931 B2 * | 11/2003 | Mizoguchi et al. | 365/200 |
| 6,757,783 B2 * | 6/2004 | Koh | 711/115 |
| 6,813,725 B1 * | 11/2004 | Hanes et al. | 714/2 |
| 6,816,982 B2 * | 11/2004 | Ravid | 714/20 |
| 6,829,672 B1 | 12/2004 | Deng et al. | |
| 6,839,864 B2 * | 1/2005 | Mambakkam et al. | 714/5 |
| 6,898,662 B2 * | 5/2005 | Gorobets | 711/103 |
| 6,920,553 B1 * | 7/2005 | Poisner | 713/2 |
| 7,039,811 B2 * | 5/2006 | Ito | 713/185 |
| 2002/0078339 A1 | 6/2002 | Hung et al. | |
| 2003/0018836 A1 * | 1/2003 | Bress et al. | 710/16 |
| 2003/0200379 A1 * | 10/2003 | Hollingsworth et al. | 711/103 |

FOREIGN PATENT DOCUMENTS

| | | |
|---|---|---|
| EP | 628908 | 12/1994 |
| EP | 1100000 | 5/2001 |
| EP | 1271332 A3 | 10/2005 |
| JP | 08335190 A * | 12/1996 |
| WO | WO 0006271 | 2/2000 |

* cited by examiner

Fig. 6C

MULTIFUNCTION SEMICONDUCTOR STORAGE DEVICE AND A METHOD FOR BOOTING-UP COMPUTER HOST

CROSS-REFERENCE TO RELATED PATENT APPLICATIONS

China P.R. Priority Application 01114883.7, filed Jun. 30, 2001 including the specification, drawings, claims and abstract, is incorporated herein by reference in its entirety. This application is a Divisional of U.S. application Ser. No. 11/520,387, filed Sep. 13, 2006, incorporated herein by reference in its entirety, which is a Divisional of U.S. application Ser. No. 10/075,492, filed Feb. 12, 2002, incorporated herein by reference in its entirety.

BACKGROUND OF THE INVENTION

1. Field of the Invention

The present invention relates to a multifunction semiconductor storage device using semiconductor storage media, in particular, a multifunction semiconductor memory device connected to the host computer via the general-purpose interface.

2. Description of the Related Art

The semiconductor storage media is a semiconductor chip for storing data; the chip can receive writing commands and data and then write them into the memory chip. The chip can also receive external read commands and read the data stored on the chip and output the data. In addition, the chip also supports other commands such as erasure and resetting commands. These kinds of semiconductor storage devices of this kind include flash memory, EEPROM, FRAM, DRAM, SRAM, SDRAM or MRAM but not are restricted to them. Compared with conventional magnetic and optic memory devices, the present semiconductor memory device has the features of small volume, less weight, large storage capacity, and higher reliability and low power consumption. In addition, it does not require any specific mechanism to drive it. For example, in Chinese patent No. ZL 00114081.7 "Full Electronic External Flash Memory Technique and Device," it discloses an external memory device using a flash memory device, wherein a semiconductor storage media and general purpose interface are used so as to realize external removable disk without external drive power supply; it supports hot dock/undock and plug-and-play function and it is not necessary to turn off the computer when doing plug and play. Furthermore, the removable memory has higher speed of data access and larger capacity than a floppy disk. In addition, it also has the advantages of small volume, easy portability, and indefectible. It can be applied to data processing systems supporting universal interface channels such as USB (universal serial bus) and IEEE1394.

Traditional floppy diskettes and floppy disk drives play less and less roles, especially after the above-mentioned external flash memory device had been invented, which makes it possible the exchange of data without floppy diskettes and floppy disk drives. However, computer users today still find that floppy diskettes and floppy disk drives are indispensable. One of the reasons is that the external flash memory disk before this invention above does not support the booting of the computer. When the computer system is infected with a virus or destroyed by the virus, an empty boot disk is needed to restart the computer through the BIOS (Basic Input and Output System). Desktop computers equip built in floppy disk drives in order to boot the system but it increases the volume and weight of the host system as well as the cost. Because of the bulkiness of the floppy disk drives, the majority of the ultra-thin laptop computers do not have built-in floppy disk drives so as to reduce the volume and weight of the computer. However, the users still have to install very expensive USB external floppy disk drives in order to boot the system and it increases the cost of the users and causes inconvenience in use.

Although the current flash memory devices such as DiskOnChip support the booting of the computer, they do not support hot plug in/out and are not removable because they are built in the computer. As a result, when the system software of the computer is destroyed by the virus, it cannot be restarted through DiskOnChip. Thus it is a restriction to the application of the device.

The current existing removable semiconductor storage devices can only be used on the driver software installed in the operating system of the computer but cannot be recognized and controlled by the BIOS of the computer, thus they cannot be used as the boot device of the system.

Most of the BIOS manufacturers have produced the BIOS capable of supporting the boot function of the external USB floppy disk drive, such as the BIOS of AWARD. Furthermore, many of the mainboard producers have adopted the above-mentioned BIOS, for example, ASUS motherboard, which lays the foundation for the large-scale use of the present invention.

SUMMARY OF THE INVENTION

In view of the deficiencies of the conventional storage devices, an object of the present invention is to provide a semiconductor storage device capable of simulating and realizing the functions of various storage disks as well as acting as the removable boot device of the computer system.

The present invention provide a multifunction semiconductor storage device capable of hot plug in/out and being removable connected to the host system through the general purpose interface, including a semiconductor storage media module and a controller module, wherein the controller module comprises a general purpose interface control module, a microprocessor and control module, said semiconductor storage device can realize the device class protocol of the floppy disk drive, simulate and implement the storing function of the floppy diskette working on the floppy disk drive, or realize the device class protocol of the CD-ROM drive, simulate and implement the storing function of the CD-ROM working on the CD-ROM drive, or realize the device class protocol of the ZIP disk, simulate and implement the storing function of the ZIP disk, or realize the device class protocol of the MO disk, simulate and implement the storing function of the MO disk.

The present invention further provides a method for booting-up computer using the multifunction semiconductor storage device, comprising the steps of: storing the boot program of the operating system and operating system programs into the multifunction semiconductor storage device; connecting the multifunction semiconductor storage device with the computer host system through the general purpose interface; identifying the general purpose interface, and controlling and reading/writing the multifunction semiconductor storage device based on BIOS after powered up the computer host system; and loading the boot program of the operating system and operating system programs stored in the multifunction semiconductor storage device to computer host system for achieving computer booting-up.

The protocols supported by the present semiconductor storage device are UFI protocol, SFF8020I protocol, SFF8070I protocol, SCSI Transparent Command Set protocol, Reduced Block Commands (RBC) T10 Project 1240-D protocol, ZIP disk protocol and MO protocol.

The semiconductor storage media module corresponds to a storage space or it can be divided into at least two storage spaces with each corresponding to a storage disk. Preferably, each of the storage spaces can be further divided into smaller spaces such as a data area for storing data and a special information area for storing a special information, in which the special information contains information related to the storage disk, the password and the digital signature of the user, and so on.

The semiconductor storage device according to the present invention can be recognized, controlled and accessed by the BIOS of the host system. The semiconductor storage media module can store the boot program of the operating system and the operating system programs. When the BIOS of the host computer platform is powered up, the system then loads the boot program of the operating system and the operating system programs from the semiconductor storage media module so as to realize the booting of the host system.

Preferably, in the semiconductor storage device according to the present invention, the semiconductor storage media module can store the driver program of the semiconductor storage device itself so as to realize the function of storing the driver program in itself.

Preferably, the semiconductor storage device according to the present invention further includes the write protect switch capable of offering physical protection to the semiconductor storage media module so as to preventing the contents from being over rewritten or erased. The write protect switch is electrically connected to the microprocessor and control module electrically.

Preferably, the semiconductor storage device according to the present invention further includes an LED indicator, which comprises one or more indicator parts, which can show the status of the semiconductor storage device. The LED indicator is electrically connected to the microprocessor and control module electronically.

In the semiconductor storage device according to the present invention, preferably, the controller module further comprises a buffer module, and the buffer module is a static random access memory (SRAM), and is electrically connected to the microprocessor and control module.

In the semiconductor storage device in the present invention, preferably, the semiconductor storage media module further comprises buffer area.

In the semiconductor storage device according to the present invention, preferably, the semiconductor storage media module further comprises a special information area for storing relevant data, password and the digital signature of the user. There can be no special information area in the device.

Preferably, the semiconductor storage device in the present invention further includes a storage disk selection switch for selecting at least a storage disk from all of the storage disks, so that the selected storage disk can be recognized, controlled and accessed by the host system.

The present invention provides a unique design so as to realize various device class protocols at the interface application level of the semiconductor storage device, and it can simulate and implement the various storage capacities of the storage disks. One or more storage spaces are provided in the semiconductor storage media, and one or more storage disk functions are supported in the same device. The present invention fully realizes the storage function of the external floppy drive and the floppy diskette using the general purpose interface, making it possible the entire substitution of floppy diskette and floppy disk drives. The semiconductor storage device in the present invention has a smaller size, light weight, a more stable performance and a higher reliability than those of the conventional semiconductor storage device, and it supports hot plug in/out and is removable. Accordingly, it is possible to make the host system being smaller in size and being portable. Furthermore, it effectively reduces the costs of the computer.

DETAILED DESCRIPTION OF THE PREFERRED EMBODIMENTS

Figure 1:
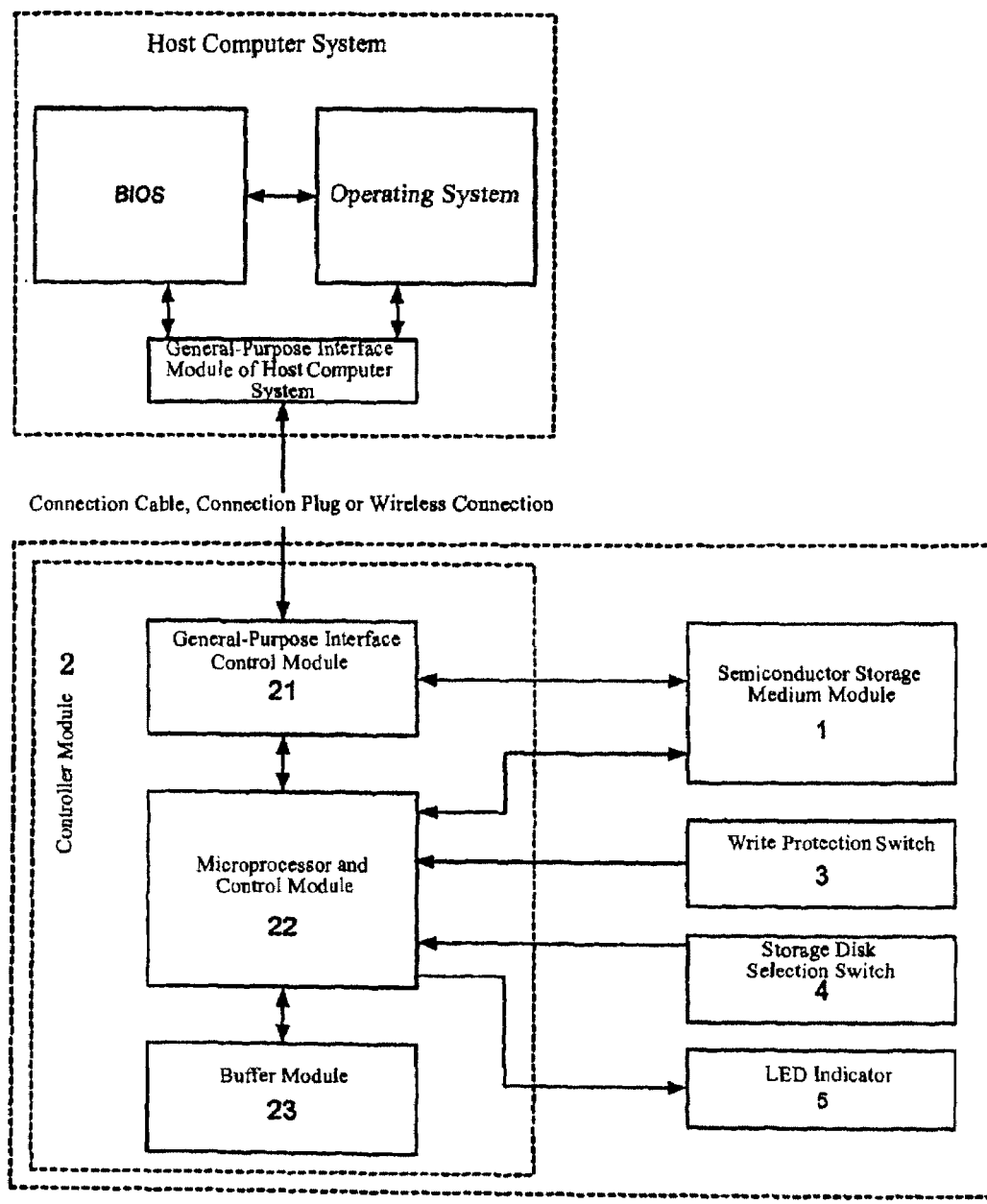
FIG. 1 is a block diagram of the functions of the multi-purpose hardware used in the semiconductor storage device of the present invention.

FIG. 1 is a block diagram of the functions of the multi-purpose hardware in an embodiment of the present invention. The semiconductor storage device is connected to the host computer via the general-purpose interface connecting cable or a connecting plug or through wireless connection mode. The semiconductor storage device comprises a semiconductor storage media module 1, a controller module 2, a write protect switch 3, a storage disk selection switch 4 and a LED indicator 5, wherein the controller module comprises a general purpose interface control module 21, a microprocessor and control module 22, and a buffer module 23.

The semiconductor storage media module 1 consists of one or more semiconductor storage media chips, the semiconductor storage media can be a flash memory, an EEPROM, FRAM, SRAM, DRAM, SDRAM and a MRAM but be not restricted to them, which is connected through the current addressing method for storing data. The semiconductor storage media module 1 corresponds to either one storage space or at least two storage spaces. The semiconductor storage media module 1 can store the driver program of the semiconductor storage device itself so as to realize the function of storing the driver program in itself.

The controller module 2 executes the initialization of the device, the control of the device, the initialization and control of the general purpose interface, the reception, the interpret and implementation of the commands sent from the host computer, the storage of the data to the semiconductor storage module 1 or the reading of the data from the semiconductor storage module 1 and the return of the executing result to the host system through the general purpose interface.

The general purpose interface control module 21 of the controller module 2 executes the connection with the host system, interprets, converts, controls and transmits the general purpose interface protocol. The general purpose interface can be either wired general purpose interface, including USB interface, IEEE1394 interface, or wireless general purpose interface, including Bluetooth interface, IrDA infrared interface, HomeRF interface, IEEE802.11a interface, IEEE802.11b interface but be not restricted to them.

The microprocessor and control module 22 initializes the general purpose interface control module 21, reads the status of the storage disk selection switch 4, determines the device class protocol implementing the floppy disk drive in accordance with the status of the storage disk selection switch 4, simulates and realizes the storage function of the floppy diskette working on the floppy disk drive; or it realizes the device class protocol of the hard disk, simulates and implements the storage function of the hard disk, or it realizes the device class protocol of the ZIP disk, simulates and implements the storage function of the ZIP disk, or it realizes the device class protocol of the MO disk, simulates and implements the storage function of the MO disk; furthermore, it can support hot plug in/out and is removable. The device class protocol supported by the storage disk is UFI protocol, SFF8020I protocol, SFF8070I protocol, SCSI Transparent Command Set protocol, Reduced Block Commands (RBC) T10 Project1240-D protocol, ZIP disk protocol, and MO disk protocol. The storage disk selection switch 4 can select one storage disk or more disks at the same time.

One and more storage disks in the device can store other driver program for the other storage disks of the device according to the present invention and realize the function of the storing itself driver program.

The microprocessor and control module 22 has the functions of:
a. initializing the semiconductor storage module and detecting the capacity, the manufacturer and the quantity of the storage chip in the semiconductor storage module;
b. receiving control commands based on the general purpose interface protocol and interpreting and executing the control commands and returning the results of executions to the host system through the general purpose interface;
c. receiving the simulated storage disk device class protocol, interpreting and executing related commands and returning the results of executions to the host system through general purpose interface; the related commands include reading data, writing data, the reading device information and reading device capacity;
d. receiving customized storage disk device class protocol, interpreting and executing corresponding commands and returning the results of executions to the host system through the general purpose interface; the corresponding commands include reading data, writing data, reading device information and read devicing capacity but be not restricted to them;
e. writing data into the semiconductor storage device or reading data from the semiconductor device; when reading data, the LED indicator blinks; when executing writing operation, the status of the write protect switch will be detected, and if the switch is in the status of the write-protection, writing request will be refused and the operation failure will be informed to the host computer;
f. converting the logical addresses in the storage device defined on the host system into actual the storage chip number and physical addresses of the storage chip;
g. when the connection between the microprocessor and control module 22 and the host system is established, the LED indicator is lighted on.

Since the difference between the storage modes of the semiconductor storage media, the buffer module 23 may be not a necessary device in certain cases; before the erasure of some data block of the semiconductor storage module, the buffer module is used to save the original data of the storage units and write the data into the buffer and finally write the data of the buffer back into the semiconductor storage media. The buffer module can be the SRAM and some part of the semiconductor storage module can also function as the buffer. As a result of the difference in the storage media, the operation of erasure can be optional.

The functions of the controller module 2 can be realized by using one or more integrated circuit chips, and the chips can be an ASIC, or an SOC or a monolithic processor with firmware.

Figure 2:
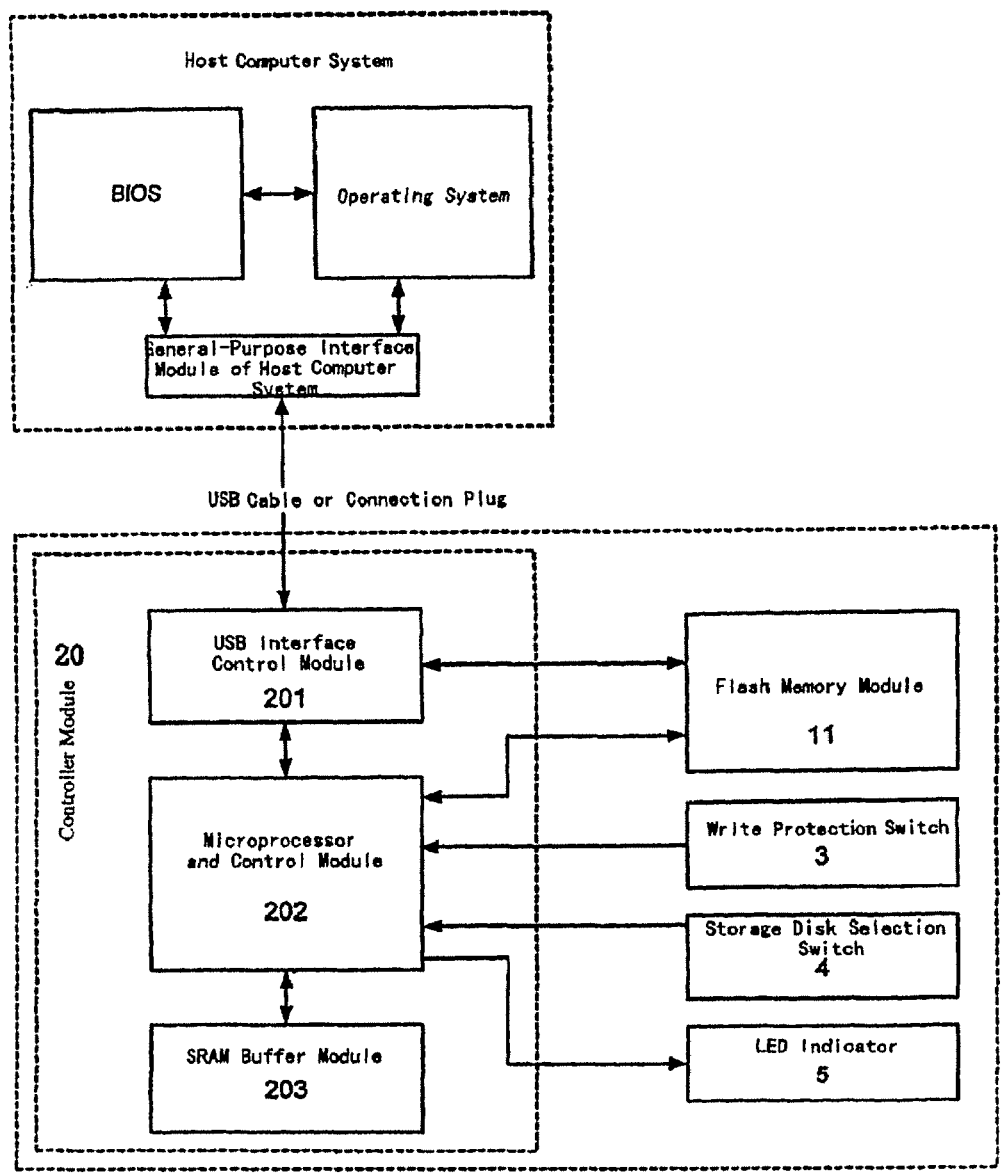
FIG. 2 is a block diagram of the functions of the hardware using the USB interface and the flash memory in an embodiment according to the present invention.

FIG. 2 is the block diagram of the flash memory with the USB interface in an embodiment according to the present invention.

In the embodiment, the USB interface is used as the general-purpose interface and the flash memory is used as the semiconductor storage media. In the embodiment, a flash memory module 11, a controller module 20, a write protect switch 3, a storage disk selection switch 4, a LED indicator 5 and so on are included. The controller module includes a USB interface controller module 201, a microprocessor and control module 202 and an SRAM buffer module 203.

The flash memory module 11 is formed with either one or a plurality of semiconductor flash memory chips, and is connected in accordance to the addressing method for storing data.

The controller module 20 executes the initialization of the device, the control over the device, the initialization and the control of the USB interface, the reception of the commands and data from the host system, the interpretation and the execution of the commands from the host system, writing data to the flash memory module 11 or reading data from the flash memory module and returning the results of the execution to the host system through the USB interface.

The USB interface control module 201 in the controller module establishes a USB connection with the host system that interprets, converts, controls and transmits the USB protocol.

The microprocessor and control module 202 initializes the USB interface control module 202, reads the status of the storage disk selection switch 4, and determines whether it supports the floppy disk drive device class protocol such as the UFI, the SFF80801 protocol or the large capacity storage disk device protocol such as the SFF80701, the SCSI Transparent Command Set and the Reduce Block Commands (RBC) T10 Project 1240-D protocols based on the status of the switch 4.

The microprocessor and control module 202 have the similar functions with the above mentioned microprocessor and control module 22, such as initializing the flash memory module, detecting the capacity, the manufacturer and the quantity of the flash memory chips, etc. The microprocessor and control module 202 receives the standard control commands based on the USB protocol, interprets and executes the control commands and returns the results of the execution to the host system through USB interface. The standard USB commands include the following: GET_STATUS, CLEAR_FEATURE, SET_FEATURE, SET_ADDRESS, GET_DESCRIPTOR, SET_DESCRIPTOR, GET_CONFIGURATION, SET_CONFIGURATION, GET_INTERFACE, SET_INTERFACE, SYNCH_FRAME, etc., but be not restricted to them.

The embodiment as shown in FIG. 2 has two working statuses:
1. The Status of the Simulated Floppy Disk Drive and the Floppy Diskette When the semiconductor storage device in the embodiment according to the present invention is in the status of the simulated floppy disk drive and floppy diskette, the device supports the floppy disk drive device class UFI(USB Floppy Interface) protocol. The microprocessor and control module 202 communicates with the host system through USB interface in conformity with the CBI (Control/Bulk/Interrupt) transport protocol. According to the CBI protocol, the microprocessor and control module 202 unpacks the data packets received from the USB interface, extracts the floppy disk drive device class UFI commands from the unpacked data, then executes the related device class commands, packs the results of the execution or the status information according to the CBI protocol, and returns the results to the host system through the USB interface.

The device class commands related to the floppy disk drive include Format Unit, Inquiry, Start/Stop, Mode Select, Mode Sense, Prevent/Allow Media Removal, Read (10), Read (12), Read Capacity, Read Format Capacity, Request Sense, Rezero track, Seek (10), Send Diagnostic, Test Unit Ready, Verify, Write (10), Write (12), Write and Verify, etc., but not restricted to them.

The explanation of several principal commands used in the embodiment of the present invention will be described hereafter:

The inquiry command is used to inquire the related parameters and configuration information of the device, the host system or the driver program of the BIOS configure the device with the above related parameters and configuration information while the device is turned on or reset. The control module returns the configuration information of the device to the host computer according to the UFI protocol and sets the data bit for Peripheral Device Class in the configuration information as Direct-access device.

The Mode Sense command is used to permit the device to notify the storage media class and the device parameters to the host computer. There is one bit of Media Class Codes in the information notified to the host computer. The code is used to determine the capacity and class of the device. As the capacity of the simulated floppy diskette is 1.44 MB, the defined code is 0.times.96 (hexadecimal).

The Read Capacity command is used to request the device to notify the capacity of the storage disk. The data returned from the device show that the total capacity is 1.44 MB.

The Read Format Capacity command permits the host system to request the possible capacity of the storage disk to be formatted and only one answer from the device is 1.44 MB.

The Test Unit Ready command permits the host system to test whether the device is ready, and the answer from the device is ready if it is in the ready status.

The Read 10 command is used to request the device to read data at a certain logical address in the storage disk and returns the read data to the host system. The control module then calculates the number of chips in which the logical address is located and the physical addresses in the chip based on the logical address and the capacities of various storage chips. Then it sends reading data command and address information to the flash memory, reads data from the flash memory, and sends the data to the host system. When the control module is reading and transmitting data, the LED indicator 5 flashes.

The write 10 is used to request the device to receive data from the host system, then write the received data at a certain logical address in the storage disk; the control module first detects the write protection switch, the control module refuses the write operation from the host computer and reports failure of write operation when the write protect switch is in write protecting status. When the switch is not in the write protect status, the control module calculates the chip number in which the logical address is located, the physical address and the block address in the chip based on the logical address and the capacities of various storage chips. When data are written into an address in the flash memory, the block containing the address should firstly be erased, thus the original data will be lost in the block; therefore, the data stored in the block address should be read out and written into the buffer module of the SRAM. Then, the data are written into the SRAM buffer module according to the relative address in the block. Next, the corresponding block in the flash memory is erased and the data block in the SRAM buffer module is written into the corresponding block of the flash memory, and the entire write operation is completed. The control module keeps the LED indicator 5 flashing when receiving and writing data.

The other working status of the embodiment as shown in FIG. 2 is described hereafter:

2. The Status of the Large Capacity Storage Disk

The large capacity storage disk can be a simulated hard disk, a simulated CDROM, a simulated ZIP disk and a simulated MO disk, etc.

When the semiconductor storage device of the embodiment according to the present invention is in the working status of the large capacity storage disk, the device supports SFF80701 device class protocol, The microprocessor and control module 202 communicates with the host system through USB interface according to the BulkOnly transport protocol. The control module 202 unpack the data packet from the USB interface according to the BulkOnly transport protocol, extracts the SFF80701 class commands from the unpacked data, executes the corresponding commands, packs the results of the execution for the corresponding command, and sends them to the host system through USB interface. The SFF80701 class commands include Format Unit, Inquiry, Mode Select, Mode Sense, Prevent/Allow Media Removal, Read (10), Read (12), Read Capacity, Read Format Capacities, Request Sense, Seek, Start Stop Unit, Test Unit Ready, Verify, Write (10), Write (12), Write and Verify, etc.

The explanation of several principal commands used in the embodiment of the present invention will be described hereafter:

The Read Capacity command is used to request the host system to get the capacity of the storage disk of the device. The control module calculates the total capacity of the storage module according to the model and quantity of the flash memory chips detected. The capacity of the large capacity storage disk is obtained by subtracting a 1.44 MB and the capacity occupied by other special information from the total capacity. The obtained capacity value is returned to the host system.

The Read 10 command is used to request the device to read data at a certain logical address in the storage disk and returns the read data to the host system. The control module firstly adds 1.44 MB (floppy capacity) to the logical address, and calculates the number of the chips in where the logical address is located and the physical addresses in the chip based on the logical address and the capacities of various storage chips. Then it sends the read data command and address to the flash memory, reads data from the flash memory, and sends the data to the host system. When the control module is reading and transmitting data, the LED indicator 5 flashes.

The write 10 is used to request the device to receive data from the host system and writes the received data at a certain logical address in the storage disk; the control module firstly detects the write protection switch. The control module refuses the write operation from the host computer and reports failure of write operation when the write protection switch is in write protection status. If the switch is not in the write protection status, the control module first add 1.44 MB of floppy capacity to the logical address, and calculates the chip number in where the logical address is located, and the physical address and the block address in the chip based on the logical address and the capacities of various storage chips. When data are written in an address in the flash memory, the block containing the address should firstly be erased, thus the original data will be lost in the block; therefore, the data stored in the block address should be read out and written into the buffer module of the SRAM. Then, the data are written into the SRAM buffer module according to the relative address in the block. Next, the corresponding block in the flash memory is erased and the data block in the SRAM buffer module is written into the corresponding block in the flash memory, and the entire write operation is completed. The control module keeps the LED indicator 5 flashing when receiving and writing data.

When the microprocessor and control module 22 establishes a connection with the host system, the LED indicator 5 is turned on.

Figure 3:
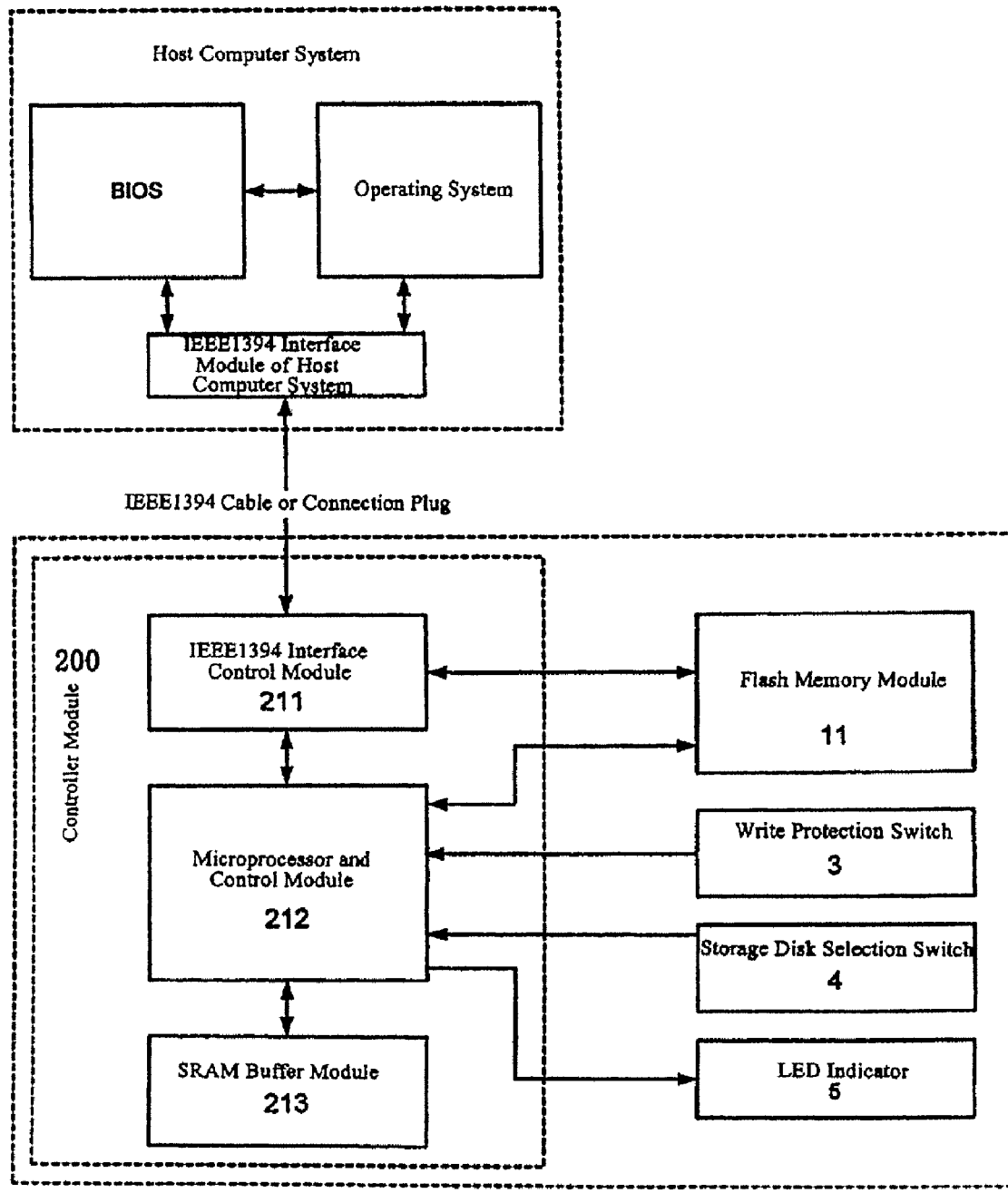
FIG. 3 is a block diagram of the functions of the hardware using the IEEE1394 interface and the flash memory in an embodiment according to the present invention.

FIG. 3 shows another embodiment of the semiconductor storage device of another embodiment according to the present invention. It is a block diagram of the hardware of the IEEE1394 interface and flash memory. In the embodiment, the general-purpose interface is an IEEE1394 interface and the semiconductor storage media is the flash memory. It includes a flash memory module 11, a controller module 200, a write protection switch 3, a storage disk selection switch 4, and a LED indicator 5. The controller module 200 includes an IEEE 1394 interface control module 211, a microprocessor and control module 212, and an SRAM buffer module 213.

The flash memory module 11 is formed with one or a plurality of semiconductor flash memory chips and is connected by the conventional addressing mode so as to store data.

The controller module 200 executes the initialization of the device, the control over the device, the initialization and the control of the IEEE1394 interface, the reception of the commands and data from the host system, the interpretation and the execution of the commands from the host system, writing data to the flash memory module 11 or reading data from the flash memory module and returning the results of the execution to the host system through the IEEE1394 interface.

The IEEE1394 interface control module 211 in the controller module establishes connection with the IEEE1394 interface of the host system, and handles the interpretation, conversion, control and transport of the IEEE1394 protocol.

The microprocessor and control module 212 initializes the IEEE1394 interface control module 211, reads the status of the storage disk selection switch 4 and thereby determines whether it supports the floppy disk drive device class protocol such as SFF80701, SCSI Transparent Command Set and Reduce Block Commands (RBC) T10 Project 1240-D protocols, but not restricted to them.

Further, the microprocessor and control module 212 also initializes the flash memory module, detects the capacity, the manufacturer and the quantity of the flash memory chips, etc. The microprocessor and control module 212 receives the standard control commands based on the IEEE1394 interface protocol, interprets and executes the control commands, and returns the results of execution for the commands to the host system through the IEEE1394 interface.

The embodiment as shown in FIG. 3 has two working statuses:

1. The Status of the Simulated Floppy Disk Drive and the Floppy Diskette

When the semiconductor storage device is in the status of the simulated floppy disk drive and floppy diskette, the device supports the floppy disk drive device class UFI protocol. The microprocessor and control module 212 receives the data from the USB interface, extracts the floppy disk drive device class UFI commands from the data packets, then executes the related device class commands, and returns the results to the host system through the USB interface.

The device class commands related to the floppy disk drive include Format Unit, Inquiry, Start/Stop, Mode Select, Mode Sense, Prevent/Allow Media Removal, Read (10), Read (12), Read Capacity, Read Format Capacity, Request Sense, Rezero track, Seek (10), Send Diagnostic, Test Unit Ready, Verify, Write (10), Write (12), Write and Verify, etc., but not restricted to them. The explanation of several principal commands used in the embodiment of the present invention will be described hereafter:

The inquiry command is used to inquire the related parameters and configuration information of the device, the host system or the driver program of the BIOS configure the device with the above related parameters and configuration information while the device is turned on or reset. The control module returns the configuration information of the device to the host computer according to the UFI protocol and sets the data bit for Peripheral Device Class in the configuration information as Direct-access device.

The Mode Sense command is used to permit the device to notify the storage media type and the device parameters to the host computer. There is one bit of Media Type Codes in the information notified to the host computer. The code is used to determine the capacity and type of the device. As the capacity of the simulated floppy diskette is 1.44 MB, the defined code is 0.times.96 (hexadecimal).

The Read Capacity command is used to request the device to notify the capacity of the storage disk. The data returned from the device show that the total capacity is 1.44 MB.

The Read Format Capacity command permits the host system to request the possible capacity of the storage disk to be formatted and only one answer from the device is 1.44 MB.

The Test Unit Ready command permits the host system to test whether the device is ready, and the answer from the device is ready if it is in the ready status.

The Read 10 command is used to request the device to read data at a certain logical address in the storage disk and returns the read data to the host system. The control module then calculates the number of the chip in where the logical address is located and the physical addresses in the chip based on the logical address and the capacities of various storage chips. Then it sends the read data command and address information to the flash memory and reads data from the flash memory, and sends the data to the host system. When the control module is reading and transmitting data, the LED indicator 5 flashes.

The write 10 is used to request the device to receive data from the host system, then write the received data at a certain logical address in the storage disk. The control module first detects the write protection switch, and the control module refuses the write operation from the host computer and reports failure of write operation when the write protection switch is in write protection status. When the switch is not in the write protection status, the control module calculates the chip number in which the logical address is located, and the physical address and the block address in the chip based on the logical address and the capacities of various storage chips. When data are written into an address in the flash memory, the block containing the address should firstly be erased, thus the original data will be lost in the block; therefore, the data stored in the block address should be read out and written into the buffer module of the SRAM. Then, the data are written into the SRAM buffer module according to the relative address in the block. Next, the corresponding block of the flash memory is erased and the data block in the SRAM buffer module is written into the corresponding block in the flash memory, and the entire write operation is completed. The control module keeps the LED indicator 5 flashing when receiving and writing data. The other working status of the embodiment as shown in FIG. 3 is described hereafter:

1. The Status of the Large Capacity Storage Disk

When the semiconductor storage device of the embodiment is in the working status of the large capacity storage disk, the device supports SFF80701 device class protocol. The microprocessor and control module 212 extracts the SFF80701 type commands from the received data through IEEE1394 interface, executes the related command, sends the result of the execution or a status information to the host system through IEEE1394 interface. The SFF80701 class commands include Format Unit, Inquiry, Mode Select, Mode Sense, Prevent/Allow Media Removal, Read (10), Read (12), Read Capacity, Read Format Capacities, Request Sense, Seek, Start Stop Unit, Test Unit Ready, Verify, Write (10), Write (12), Write and Verify, etc., but not restricted to them.

The explanation of several principal commands used in the embodiment of the present invention will be described hereafter:

The Read Capacity command is used to request the host system to get the capacity of the storage disk of the device. The control module calculates the total capacity of the storage module according to the model and quantity of the flash memory chips detected. The capacity of the large capacity storage disk is obtained by subtracting 1.44 MB and the capacity occupied by other special information from the general (total) capacity. The obtained capacity value is returned to the host system.

The Read 10 command is used to request the device to read data at a certain logical address in the storage disk and returns the read data to the host system. The control module firstly adds 1.44 MB (floppy capacity) to the logical address, and calculates the number of chips in which the logical address is located and the physical addresses in the chip based on the logical address and the capacities of various storage chips. Then it sends the read data command and address information to the flash memory and reads data from the flash memory, and sends the data to the host system. When the control module is reading and transmitting data, the LED indicator 5 flashes.

The write 10 is used to request the device to receive data from the host system, then write the received data at a certain logical address in the storage disk; the control module firstly detects the write protection switch. The control module refuses the write operation from the host computer and reports failure of write operation when the write protection switch is in write protection status. If the switch is not in the write protection status, the control module first add 1.44 MB of floppy capacity to the logical address, and calculates the chip number in which the logical address is located, and the physical address and the block address in the chip based on the logical address and the capacities of various storage chips. When data are written into an address of the flash memory, the block containing the address should firstly be erased, thus the original data will be lost in the block; therefore, the data stored in the block address should be read out and written into the buffer module of the SRAM. Then, the data are written into the SRAM buffer module according to the relative address in the block. Next, the corresponding block in the flash memory is erased and the data block in the SRAM buffer module is written into the corresponding block of the flash memory, and the entire write operation is completed. The control module keeps the LED indicator 5 flashing when receiving and writing data.

Figure 4:
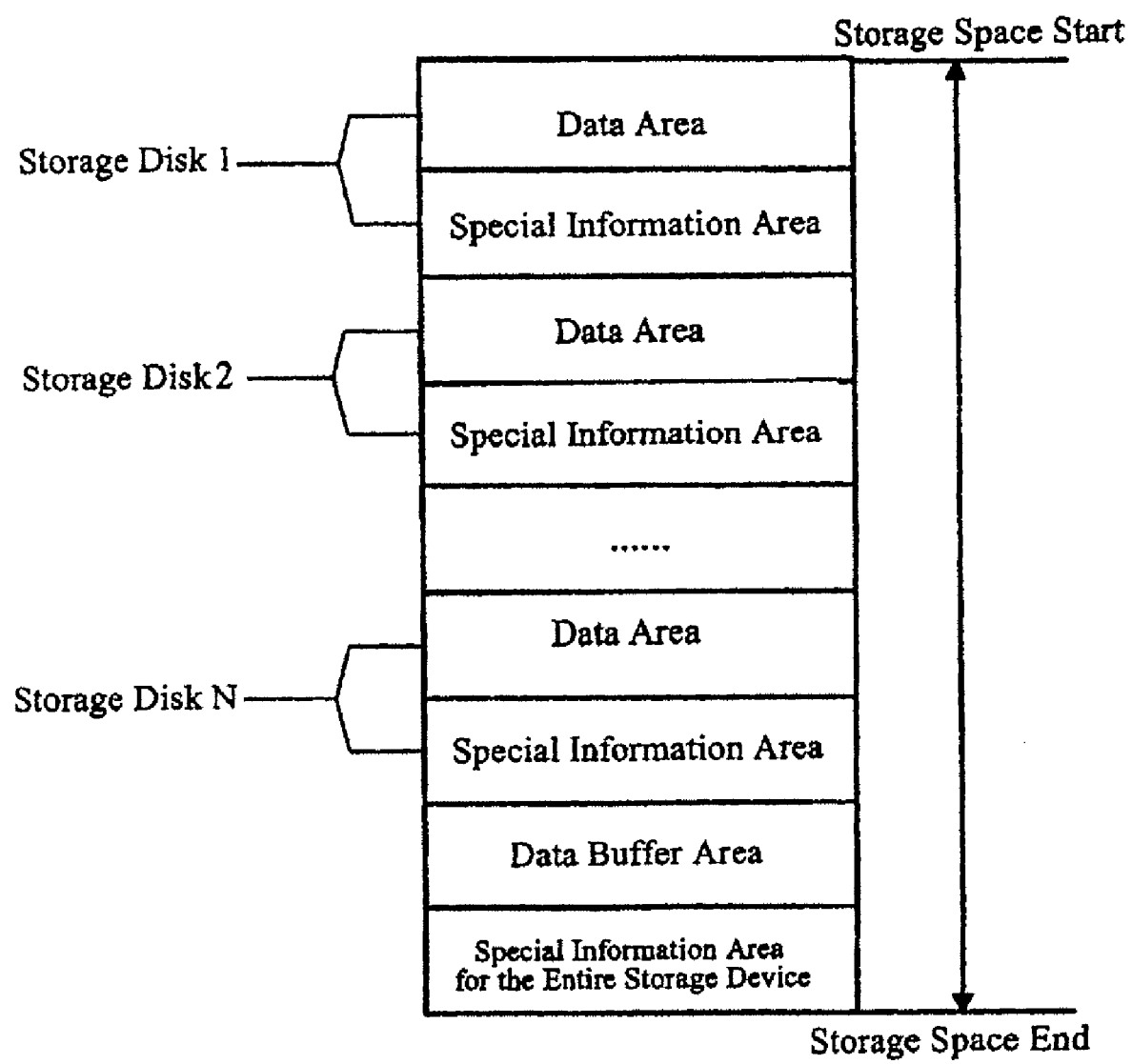
FIG. 4 shows the storage spaces allocation of the semiconductor storage device in an embodiment of the present invention.

When the microprocessor and control module 212 establishes a connection with the host system, the LED indicator 5 is turned on. FIG. 4 shows the allocation of the storage spaces of the semiconductor storage module. The entire storage module includes N storage spaces with each corresponding to one storage disk. Alternatively, the storage module can contain a data buffer area or not, and can contain a special information area for the entire storage device or not. Each of the storage spaces includes a data area and a special information area. Alternatively, each of the storage spaces may not include the special information area. The data buffer area functions as the buffer module 23 (see FIG. 1). The entire special information area of the storage device can be used to store information about the storage device, such as the record of the bad blocks of the flash memory, the passwords and the digital signatures of the users, etc., but not restricted to them.

Figure 5:
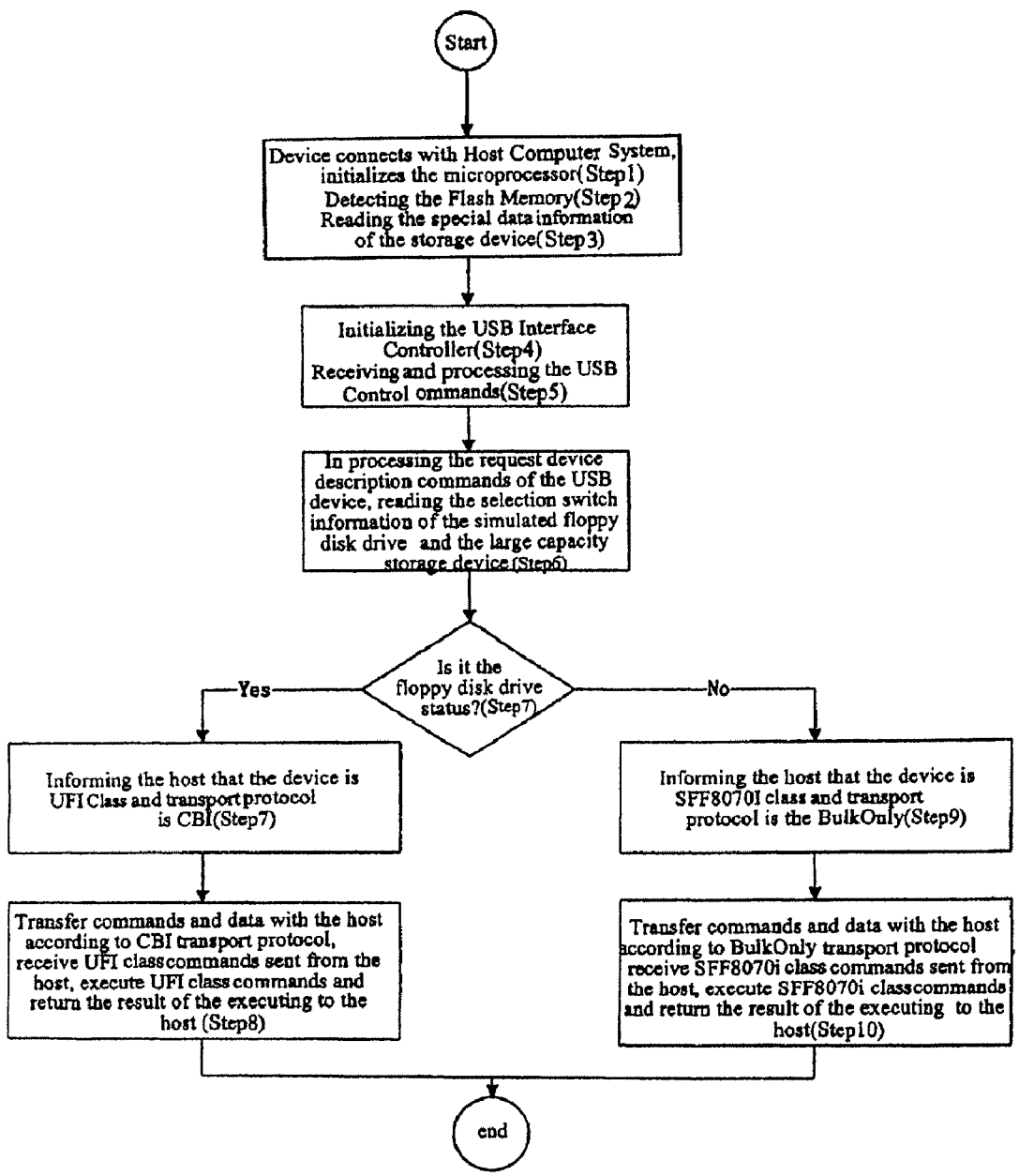
FIG. 5 is a working flow chart of the embodiment shown in FIG. 2.
Figure 6A:
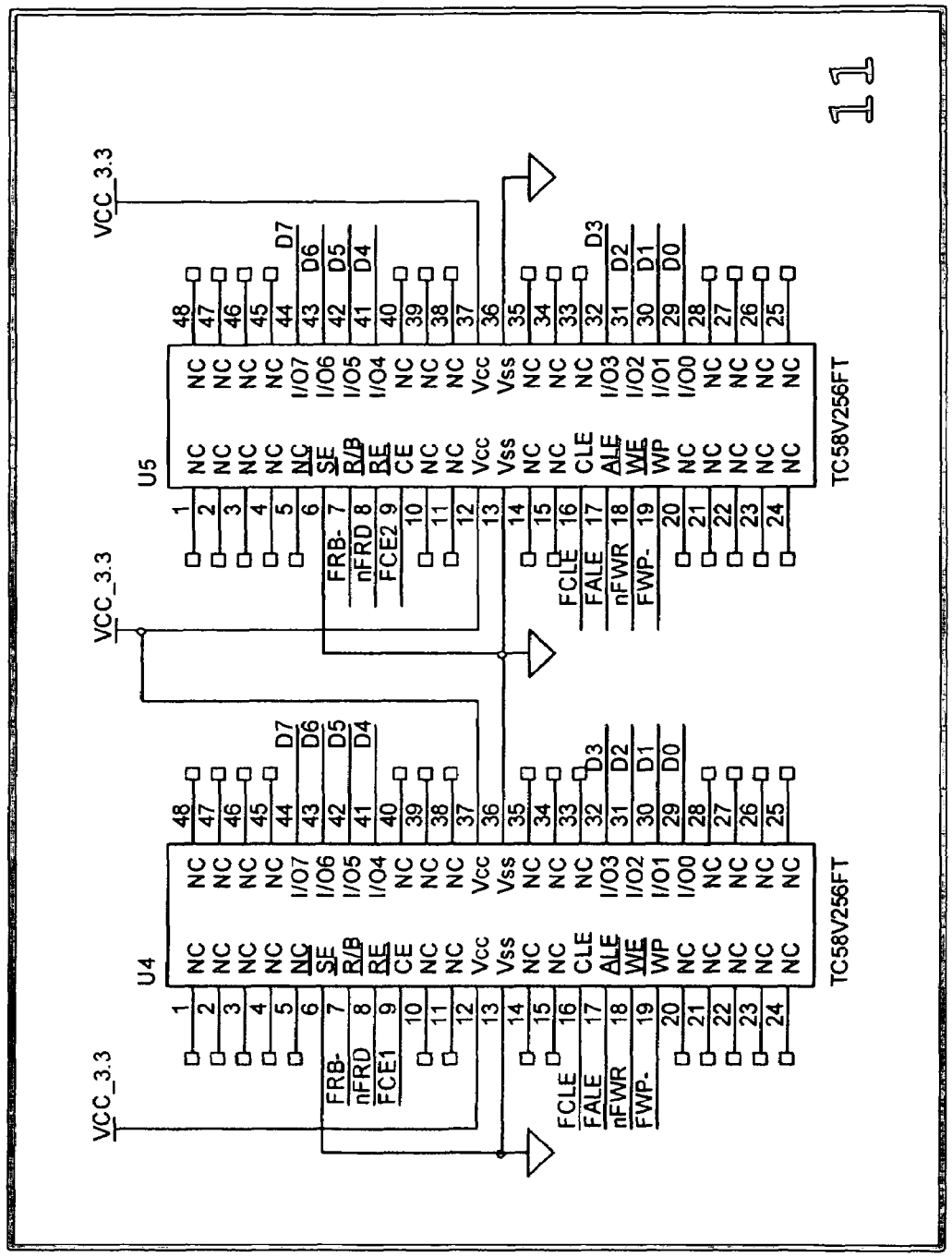
FIGS. 6A, B, C, D shows the circuits schematics of the embodiment shown in FIG. 2 according the present invention, respectively.
Figure 6B:
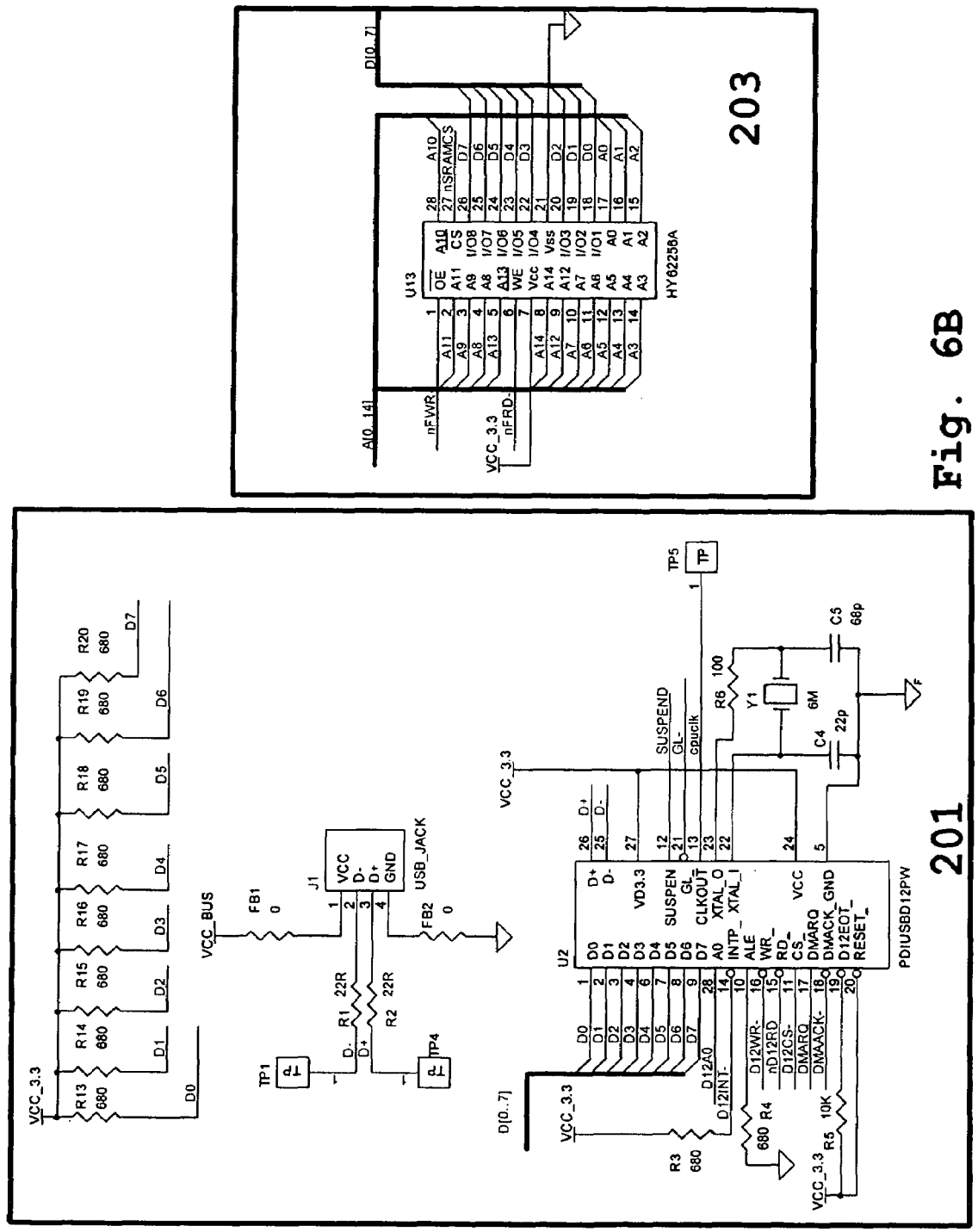
Figure 6D:
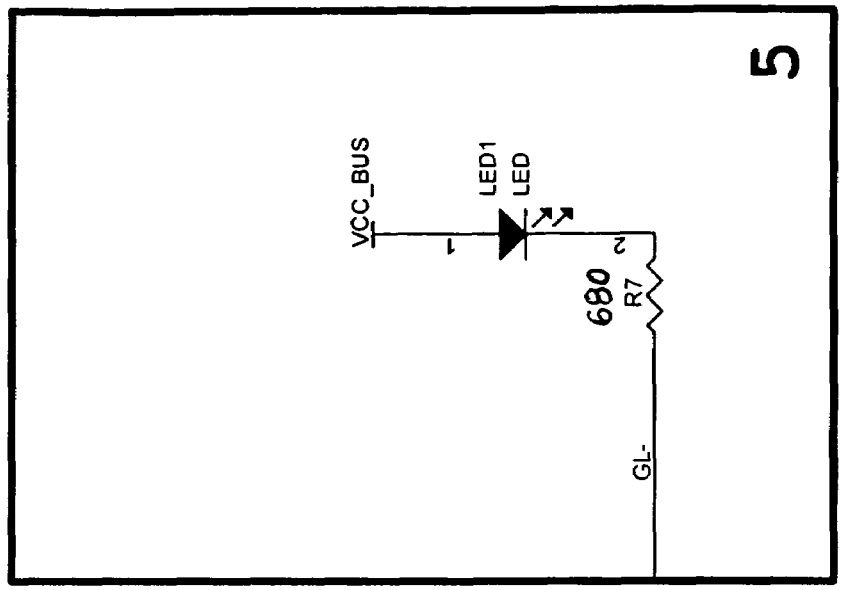
Figure 6D:
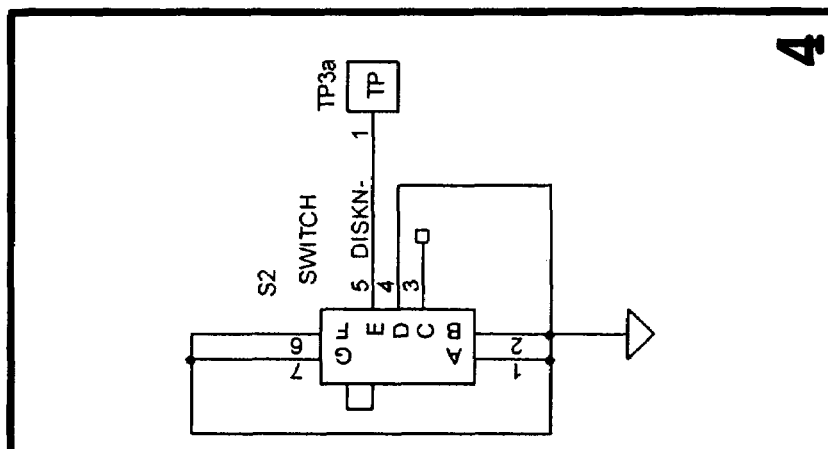
Figure 6D:
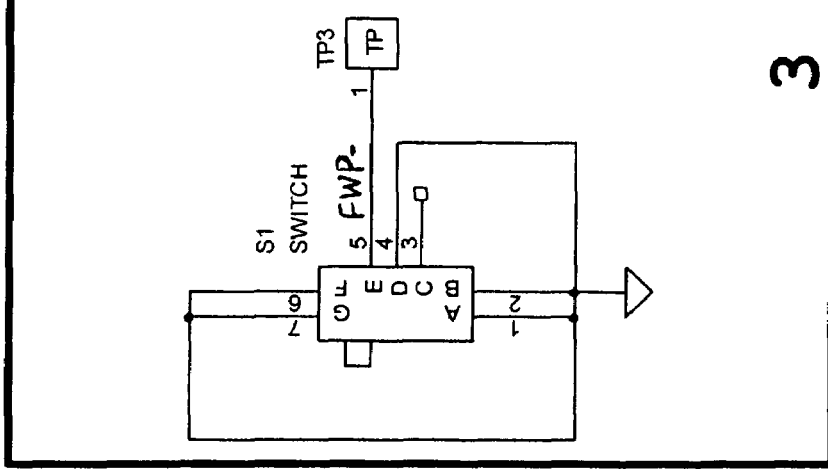

FIG. 5 is a working flow chart of the device of the embodiment in FIG. 2.

In step 1, it establishes connection with the USB interface of the host system from where it acquires electrical power. At this time, the microprocessor and control module 202 firstly initializes the microprocessor and control module 202, including the setting of the different registers and of the operation frequencies.

In step 2, the microprocessor and control module 202 detects the storage module of the flash memory and obtains the model, capacity, manufacturer and total number of the storage chips and saves the results of the detection.

In step 3, the microprocessor and control module 202 reads the special information of the storage device, in which the bad block table is included but not restricted it.

In step 4, the microprocessor and control module 202 initializes the USB interface controller.

In step 5, the microprocessor and control module 202 receives the USB control commands from the host system and executes related commands and returns the results of execution. When the request device description command is executed, the control module detects the "floppy disk drive" and "large capacity storage disk" status switch and determines which status the device is in, that is, which device class protocol and transport protocol are supported by the device. The control module then informs to the host computer the device class protocol and transport protocol supported by the device. When it is in the "floppy disk drive" status, the device supports the UFI device class protocol and the CBI transport protocol, and when it is in the "large capacity storage disk" status, the device supports the SFF80701 device class protocol and the BulkOnly protocol.

In step 6, the host computer determines whether the storage device is a "floppy disk drive" or a "large capacity storage disk" based on the returned device class protocol and transport protocol. If the device is in the "floppy disk drive" status, the host computer then sends UFI class device commands to the device based on the CBI transport protocol in step 7, and if the device is in the "large capacity storage disk," the host computer then sends SFF80701 type device commands to the device based on the BulkOnly transport protocol in step 9. If the device is in the "floppy disk drive" status, the control module then receives UFI class commands from the host system according to the CBI transport protocol, interprets and executes the related commands, and returns the results of the executing or the status message to the host system in the format of the CBI transport protocol in step 8. And if the device is in the status of "large capacity storage disk," the control module then receives the SFF80701 class commands from the host system according to the BulkOnly transport protocol, interprets and executes the related commands, and sends the results of the executing or the status message to the host system in the format of the BulkOnly transport protocol in step 10.

Once the power of the host computer is off or the device is removed from the host system, the device stops working.

A description of the Use of the embodiment in FIG. 2 as the system boot disk:

The following is a description of the system boot disk using the USB interface flash memory device based on Window 98/Me/200/XP operating systems. It is noted that the device cannot only be used as the system boot disk for Window98/Me/2000/XP, but also suitable for other operating systems.

When the device is used as the system boot disk, the boot program and the system programs of the operating system should firstly be stored in the device. Here is a description about how to make a system boot disk:

1. Start Windows98/Me/2000/XP operating systems;
2. Set the storage disk status switch to "floppy disk drive;"
3. Connect the device to the USB port of the host system;
4. The related device driver program in the operating system will recognize and operate the storage disk and a new icon and characters "floppy disk drive" will appear in the icon "My Computer." It is noted that the device driver program provided by the manufacturer should be used if the system is Windows98, while under Windows Me/2000/XP, default device driver programs contained in the operating system can be used;
5. Format the floppy disk as a system boot disk and copy the corresponding files to the floppy disk, i.e., the system boot disk is produced.

When the making of the system boot disk is finished, the device can be used as the disk to boot the system. The following is a description about how to use the boot disk.

The use of the boot disk:

1. Turn on the power of the host computer.
2. Enter the BIOS setting of the system and check the "bootable system device" item. If it is not set as the USB Floppy Disk Drive, that is, the USB external floppy disk (the initial setting of the system may be a Legacy Floppy), then it is modified to USB Floppy Disk Drive. Saving the modified setting to the BIOS and exiting from the setting of the BIOS and restart the host computer machine.
3. Meanwhile, put the storage disk status switch of the device to a status "floppy disk drive" and connects the device to the USB port of the host computer machine.
4. In the booting process of the host system, BIOS will recognize the storage disk and reads the operating system boot program and the system programs stored on the storage device. Then the corresponding programs are executed and the operating system is loaded.
5. The booting of the system is completed.

A description of the use of the embodiment in FIG. 2 as a large capacity storage disk The following is a description of the USB interface flash memory storage device used as a large capacity storage disk based on Windows 98/Me/2000/XP operating system. It is noted that the device cannot only run for Windows 98/Me/2000/XP as a large capacity disk but also suitable for other operating systems as a large capacity disk.

1. Start Windows98/Me/2000/XP operating systems.
2. Set the storage disk status switch to the status at "large capacity disk."
3. Connect the device to the USB port of the host system.
4. The related device driver program in the operating system will recognize and operate the storage disk and a new icon and characters "removable disk" will appear in the icon "My Computer." It is noted that the device driver program provided by the manufacturer should be used if the operating system is Windows98, while the operating system is one of Windows Me/2000/XP, the default device driver programs contained the operating system can be used.
5. From now on reading and writing operations of the files can be carried on the large capacity disk.

What is claimed is:

1. An external storage device for realizing the storage functions of one or more types of storage disks, comprising a semiconductor storage media module, a controller module comprising a USB/IEEE1394 interface control module, and a microprocessor and control module, wherein the storage media module comprises one or more semiconductor storage media chips and stores the driver program of the device itself, the device executes a process comprising establishing connection for hot plug-and-play with a host system through a USB/IEEE1394 interface upon plugging in said external storage device;

detecting and obtaining the information of the storage module within said external storage device by the microprocessor and control module;

initializing the USB/IEEE1394 interface control module;

receiving, interpreting and executing the USB/IEEE1394 control command from said host system;

determining whether the status of said external storage device is set as a floppy disk drive or a large capacity storage disk, wherein said external storage device utilizes one set of device class protocol and transport protocol, extracts and executes the device class commands, and simulates storing function of a floppy disk working on the floppy disk drive if the detected status is floppy disk drive; and utilizes a different set of device class protocol and transport protocol extracts and executes the device class commands, and simulates storing function of a large capacity storage disk working on the large capacity disk drive if the detected status is large capacity storage disk.

2. The external storage device according to claim 1, wherein said device class protocol is UFI (USB Floppy Interface) protocol, SFF80201 protocol, SFF80701 protocol, SCSI Transparent Command Set protocol, Reduced Block Commands (RBC) T10 Project 1240-D protocol, ZIP disk protocol, CD-ROM protocol or MO (Magneto-Optical) protocol.

3. The external storage device according to claim 1, wherein said transport protocol is CBI (Control/Bulk/Intercept) transport protocol or BulkOnly protocol.

4. The external storage device according to claim 1, wherein the microprocessor and control module having function of:

receiving control commands based on the USB/IEEE1394 interface protocol and interpreting and executing said control commands and returning the results of executions to said host system through said USB/IEEE1394 interface; and receiving the simulated or customized storage disk device class protocol, interpreting and executing related commands and returning the results of executions to said host system through USB/IEEE1394 interface.

5. The external storage device according claim 4, wherein said commands include reading data, writing data, and reading device information.

6. The storage device according claim 5, further comprising a LED indicator for indicating the status of the semiconductor storage device, wherein the LED indicator is electrically connected to the microprocessor and control module, wherein said reading data includes reading data from said external storage device and the LED indicator blinking while reading data.

7. The external storage device according claim 5, further comprising a write protect switch, wherein said writing data includes writing data into said external storage device after determining the status of the write protect switch.

8. The external storage device according claim 7, wherein said determining the status of a write protect switch further includes detecting if the status of the write protect switch is on and then refusing the writing request and informing said host system of the refusal.

9. The external storage device according claim 8, wherein said writing data includes converting the logical addresses in said storage device defined on said host system into actual storage chip number and physical addresses of the storage chip.

10. The storage device according claim 1, wherein the storage media module stores the driver program of the storage disk whose function is to be realized.

11. The storage device according claim 10, further comprising a storage disk selection switch for selecting at least one storage disk so that the selected disk can be recognized, controlled and accessed by the host system.

12. The external storage device according to claim 1, wherein the semiconductor storage media is flash memory, EEPROM, FRAM, SRAM, DRAM, SDRAM, or MRAM.

13. The external storage device according to claim 1, wherein when the status of the device is determined to be floppy disk drive, the device supports UFI device class protocol and communicates with the host system using CBI transport protocol.

14. The external storage device according to claim 1, wherein when the status of the device is determined to be large capacity drive, the device supports the SFF80701 device class protocol and communicates with the host system using BulkOnly transport protocol.

15. The external storage device according to claim 1, wherein the interface is USB, when the status of the device is determined to be floppy disk drive, the device supports UFI device class protocol and communicates with the host system using CBI transport protocol.

16. The external storage device according to claim 1, wherein the interface is USB, when the status of the device is determined to be large capacity drive, the device supports the SFF80701 device class protocol and communicates with the host system using BulkOnly transport protocol.

17. The external storage device according to claim 4, wherein the controller module further comprises a buffer module which is a static random access memory (SRAM) and is electronically connected to the microprocessor and control module, said buffer module saves the original data of the storage units and writes the data into the buffer and finally writes the data of the buffer back into the semiconductor storage media.

18. The external storage device according to claim 4, wherein the semiconductor storage module is a flash memory module.

19. The external storage device according to claim 11, wherein the microprocessor and control module having function of reading the status of the storage disk selection switch.

20. The external storage device according to claim 4, wherein the microprocessor and control module has function of
   initializing the USB/IEEE1394 interface control module;
   initializing the semiconductor storage module;
   detecting the capacity of the semiconductor storage module; and
   writing data into the semiconductor storage device or reading data from the semiconductor device.

21. The external storage device according to claim 1, wherein the storage media module comprises a special information area for storing special information including information related to the storage disk, password and digital signature of the user.

* * * * *